US011716357B2

(12) United States Patent
Vahlis et al.

(10) Patent No.: US 11,716,357 B2
(45) Date of Patent: *Aug. 1, 2023

(54) DATA ACCESS POLICIES

(71) Applicant: Workday, Inc., Pleasanton, CA (US)

(72) Inventors: Evgene Vahlis, Jersey City, NJ (US);
Paul Giura, Cohoes, NY (US)

(73) Assignee: Workday, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/515,616

(22) Filed: Nov. 1, 2021

(65) Prior Publication Data

US 2022/0053028 A1 Feb. 17, 2022

Related U.S. Application Data

(63) Continuation of application No. 16/591,742, filed on Oct. 3, 2019, now Pat. No. 11,196,772, which is a continuation of application No. 15/649,692, filed on Jul. 14, 2017, now Pat. No. 10,476,911, which is a continuation of application No. 14/874,874, filed on Oct. 5, 2015, now Pat. No. 9,742,808, which is a continuation of application No. 14/092,112, filed on Nov. 27, 2013, now Pat. No. 9,171,174.

(51) Int. Cl.
H04L 29/06 (2006.01)
G06F 21/00 (2013.01)
H04L 9/40 (2022.01)
G06F 21/60 (2013.01)
G06F 16/11 (2019.01)
G06F 16/245 (2019.01)
G06F 21/62 (2013.01)
H04L 9/32 (2006.01)

(52) U.S. Cl.
CPC ............ *H04L 63/20* (2013.01); *G06F 16/122* (2019.01); *G06F 16/245* (2019.01); *G06F 21/602* (2013.01); *G06F 21/6227* (2013.01); *H04L 9/3226* (2013.01); *H04L 63/0428* (2013.01); *H04L 63/105* (2013.01); *G06F 2221/2149* (2013.01)

(58) Field of Classification Search
CPC ... H04L 63/20; H04L 9/3226; H04L 63/0428; H04L 63/105; G06F 16/122; G06F 16/245; G06F 21/602; G06F 21/6227; G06F 2221/2149
See application file for complete search history.

(56) References Cited

U.S. PATENT DOCUMENTS

| 6,754,322 | B1 * | 6/2004 | Bushnell | ................. H04M 3/56 379/202.01 |
| 7,120,635 | B2 | 10/2006 | Bhide et al. | |
| 7,496,956 | B1 | 2/2009 | Viljoen et al. | |

(Continued)

*Primary Examiner* — Lisa C Lewis
(74) *Attorney, Agent, or Firm* — Van Pelt, Yi & James LLP

(57) ABSTRACT

To verify compliance with a data access policy, a query result including data specified by a requesting entity and a representation of a data access policy is received from a database. Based on the representation of the data access policy included in the query result, it is verified whether the requesting entity is permitted to access the data included in the query result. Transmission of the data included in the query result to the requesting entity is controlled responsive to the verification. Related methods, systems, and computer program products are also discussed.

15 Claims, 5 Drawing Sheets

(56) References Cited

U.S. PATENT DOCUMENTS

| | | | |
|---|---|---|---|
| 7,877,682 B2 | 1/2011 | Aegerter | |
| 8,413,211 B2 | 4/2013 | Tokutani et al. | |
| 8,429,724 B2 | 4/2013 | Thibadeau | |
| 8,438,619 B2 | 5/2013 | Olson | |
| 8,479,257 B1 | 7/2013 | Lloyd et al. | |
| 8,479,304 B1 | 7/2013 | Clifford | |
| 8,521,829 B2 | 8/2013 | Kohavi | |
| 8,544,084 B2 | 9/2013 | Owen et al. | |
| 8,601,102 B1 | 12/2013 | Lee et al. | |
| 8,949,873 B1* | 2/2015 | Bayer | H04N 21/25891 725/14 |
| 2002/0083178 A1* | 6/2002 | Brothers | H04L 63/10 709/218 |
| 2003/0046578 A1* | 3/2003 | Brown | G06F 21/10 726/1 |
| 2003/0065650 A1 | 4/2003 | Annand et al. | |
| 2003/0084027 A1* | 5/2003 | Brandin | G06F 21/6227 |
| 2004/0167984 A1 | 8/2004 | Herrmann | |
| 2005/0010612 A1* | 1/2005 | Enderwick | H04L 63/20 |
| 2005/0251865 A1* | 11/2005 | Mont | G06F 21/6245 726/26 |
| 2006/0101409 A1* | 5/2006 | Bemmel | H04L 63/20 726/4 |
| 2006/0141985 A1 | 6/2006 | Patel et al. | |
| 2008/0080551 A1 | 4/2008 | Driscoll et al. | |
| 2008/0160958 A1* | 7/2008 | Abichandani | H04W 8/183 455/410 |
| 2008/0177716 A1* | 7/2008 | Hejlsberg | G06F 16/24547 |
| 2009/0077664 A1* | 3/2009 | Hsu | G06F 21/566 711/163 |
| 2009/0089072 A1* | 4/2009 | Gupta | H04L 41/0893 705/1.1 |
| 2009/0300002 A1* | 12/2009 | Thomas | G06F 16/2457 707/999.005 |
| 2009/0307753 A1 | 12/2009 | Andrus et al. | |
| 2009/0328156 A1 | 12/2009 | Malaviarachchi et al. | |
| 2010/0095373 A1* | 4/2010 | Levenshteyn | G06F 21/6218 717/102 |
| 2010/0251329 A1 | 9/2010 | Wei | |
| 2010/0268722 A1* | 10/2010 | Yalamanchi | G06F 16/9024 707/E17.014 |
| 2011/0067086 A1* | 3/2011 | Nachenberg | H04L 63/105 726/2 |
| 2011/0145580 A1 | 6/2011 | Auradkar et al. | |
| 2011/0231889 A1 | 9/2011 | Dheap et al. | |
| 2013/0097318 A1* | 4/2013 | Gladstone | H04L 63/107 709/226 |
| 2013/0117313 A1* | 5/2013 | Miao | G16H 40/20 707/E17.005 |
| 2013/0173853 A1* | 7/2013 | Ungureanu | G06F 12/122 711/135 |
| 2013/0205374 A1 | 8/2013 | Du et al. | |
| 2013/0212367 A1 | 8/2013 | Ingalls et al. | |
| 2013/0212388 A1 | 8/2013 | D Souza et al. | |
| 2013/0247227 A1* | 9/2013 | Dutta | H04L 63/168 726/29 |
| 2013/0347056 A1* | 12/2013 | Kuhlman | H04L 9/40 726/1 |
| 2017/0149735 A9* | 5/2017 | Hutton | H04L 63/1416 |

* cited by examiner

DATA ACCESS POLICIES

CROSS-REFERENCE TO RELATED APPLICATIONS

This application is a continuation of U.S. patent application Ser. No. 16/591,742 filed Oct. 3, 2019, 2019 (now U.S. Pat. No. 11,196,772), which is a continuation of U.S. patent application Ser. No. 15/649,692 filed Jul. 14, 2017 (now U.S. Pat. No. 10,476,911), which is a continuation of U.S. patent application Ser. No. 14/874,874 filed Oct. 5, 2015 (now U.S. Pat. No. 9,742,808), which is a continuation of U.S. patent application Ser. No. 14/092,112 filed Nov. 27, 2013 (now U.S. Pat. No. 9,171,174). All sections of the aforementioned applications and patents are incorporated herein by reference in their entirety.

BACKGROUND

The present disclosure relates generally to computer networks and, more particularly, to methods, systems, computer program products for verifying compliance with data access policies.

Database technology allows users to access vast amounts of data with relative ease. For example, users or applications can use predefined queries that execute within a database and return results to the user.

However, in some contexts, it can be difficult to manage access control to data within the database. For example, while the data owner may define respective data access policies with respect to particular data, data owners may increasingly use untrusted third party databases to store their data and/or answer user queries. As such, it may be possible for a third-party server storing the database and/or a client querying the database to collude into providing access to records outside of that allowed by the corresponding access policies. It may therefore be increasingly difficult for data owners to ensure that their access policies area followed by the untrusted database or associated server(s) that store the data, and/or by the untrusted users/clients that access the data.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

According to some embodiments, in a method for verifying compliance with a data access policy, a query result comprising data specified by a requesting entity and a representation of a data access policy is received from a database. Based on the representation of the data access policy included in the query result, it is verified whether the requesting entity is permitted to access the data included in the query result. Transmission of the data included in the query result to the requesting entity is thereby controlled responsive to the verifying.

In some embodiments, the data access policy may not be locally stored in a memory associated with performance of the method.

In some embodiments, the representation may identify ones of a plurality of records stored in the database that are accessible to the requesting entity according to the data access policy, and it may be determined whether the data included in the query result corresponds to the ones of the plurality of records that are accessible to the requesting entity.

In some embodiments, the representation may be a data structure including respective values corresponding to the ones of the plurality of records that are accessible to the requesting entity. A cryptographic key that was used to generate the respective values included in the representation of the access policy may be received (for example, from a data owner), and a value corresponding to the data included in the query result may be generated using the cryptographic key. The value corresponding to the data included in the query result may be compared with the respective values included in the representation of the access policy to verify whether the requesting entity is permitted to access the data included in the query result according to the access policy.

In some embodiments, the representation of the data access policy may be a Bloom filter data structure specific to the requesting entity. The respective values included in the representation may include, for each of the plurality of records that are accessible to the requesting entity, a record identifier and a payload generated using the key.

In some embodiments, the representation of the data access policy may identify an entirety of the records stored in the database that are accessible to the requesting entity.

In some embodiments, the determining may indicate that the data included in the query result does not correspond to the ones of the plurality of records, and transmission of the data to the requesting entity may be prevented responsive to the determining.

In some embodiments, the query may include a code injection command requesting the data that does not correspond to the ones of the plurality of records.

In some embodiments, the query result may include additional data, the determining may indicate that the additional data corresponds to the ones of the plurality of records, and transmission of the additional data to the requesting entity may be allowed or permitted responsive to the determining.

In some embodiments, a query requesting the data may be received from the requesting entity, and a modified query requesting the representation of the data access policy in addition to the data may be generated responsive to receiving the query. The query result may be received from the database responsive to evaluation of the modified query.

In some embodiments, respective representations of data access policies may be generated for respective ones of a plurality of requesting entities. A respective representation may identify ones of the plurality of records stored in the database that are accessible to a respective one of the plurality of requesting entities. The database may be a secured database created to include the plurality of records and the respective representations of the data access policies for each of the plurality of requesting entities. In some embodiments, the secured database may store the data specified by the corresponding access policy as being accessible to each requesting entity, and a Bloom Filter for each requesting entity including a signature of the data that is accessible to each requesting entity under the applicable access policy.

Other methods, systems, devices, and/or computer program products according to other embodiments will become apparent to one with skill in the art upon review of the following drawings and detailed description. It is intended that all such additional methods, systems, devices, and/or computer program products be included within this description, be within the scope of the present invention, and be protected by the accompanying claims.

BRIEF DESCRIPTION OF THE DRAWINGS

Other features of example embodiments will be more readily understood from the following detailed description of specific embodiments thereof when read in conjunction with the accompanying drawings, in which.

DETAILED DESCRIPTION

Figure 1:
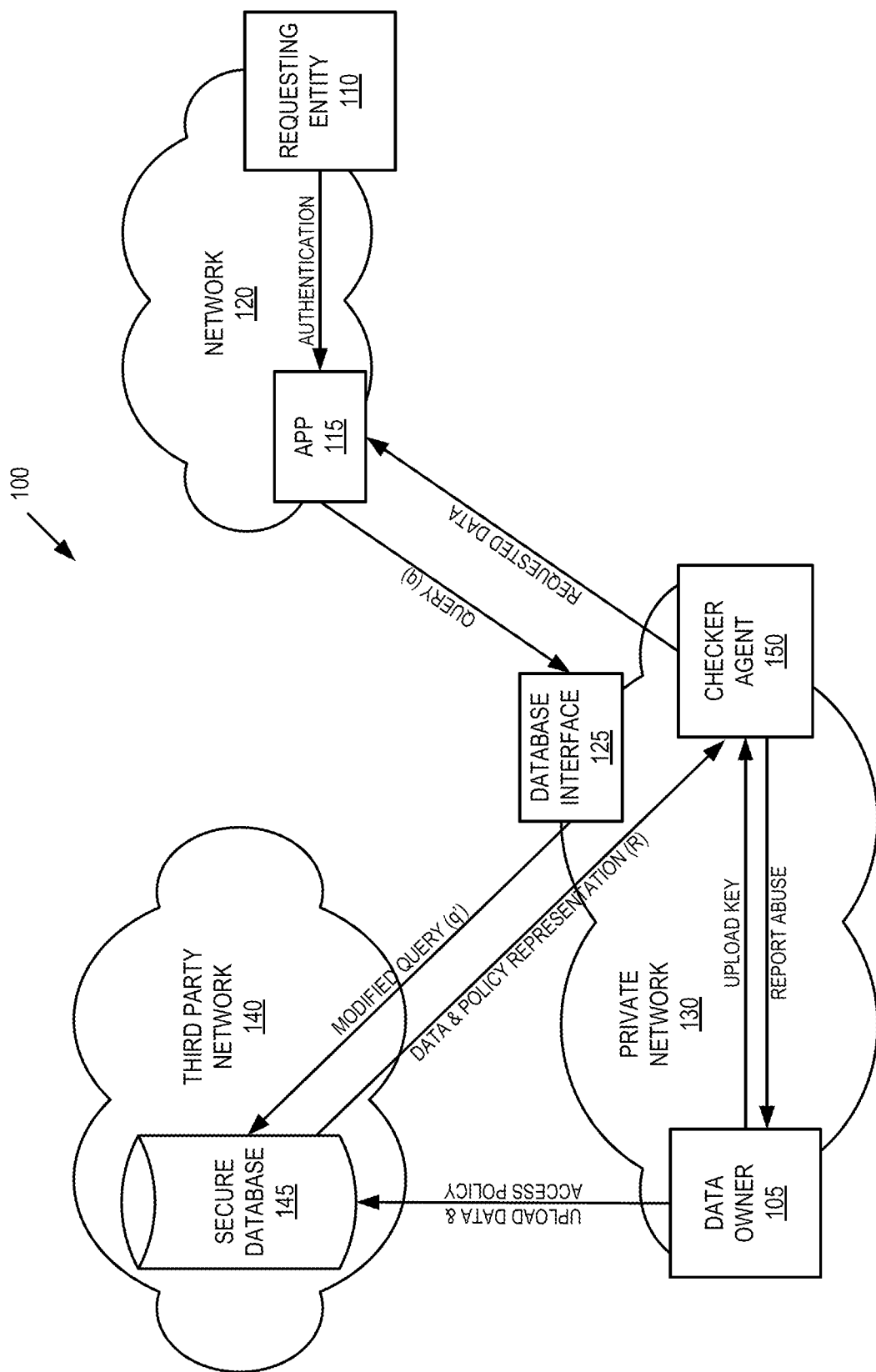
FIG. 1 is a block diagram illustrating a system for verifying compliance with data access policies for data stored in a third-party database in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Exemplary embodiments may be embodied as methods, systems, and/or computer program products. Accordingly, example embodiments may be embodied in hardware and/or in software (including firmware, resident software, microcode, etc.). Furthermore, example embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention may address problems that can arise in data access policy checking in configurations where a data owner stores data with an untrusted third party database/server/network, and where the data may be accessed by one or more users or clients. Some embodiments of the present invention provide methods, systems, computer program products, and devices that allow for verification of whether a data set returned by a third-party server in response to a client query complies with the corresponding access policy defined by the data owner, without locally storing the access policy or a description thereof.

As described herein, the data owner refers to the entity that defines the data access policies for the data stored in a third-party database. The third-party database/server/network, as well as the user, client, and/or other requesting entity, may be not be trusted by (or may otherwise be beyond the control of) the data owner. As such, in some instances the third-party server(s) and/or the user/client device querying the database can collude into allowing the client to access records beyond those specified by the applicable data access policy.

Embodiments of the present invention provide a trusted checker agent that interfaces between the data server (which stores the data) and the client requesting data records, and performs relatively simple policy checking operations on the policy data structures. In some embodiments, the checker agent may be as lightweight as possible, and may have reduced or minimal storage requirements. Embodiments of the present invention thus ensure that data owner access policies are followed by the untrusted server and/or the untrusted client.

A general architecture of a system 100 for verifying compliance with a data access policy in accordance with some embodiments of the present invention is shown in FIG.

1. Referring now to FIG. 1, the system 100 includes a user or client device (more generally referred to as a requesting entity 110), a database DB 145, a database interface DBI 125, and a checker component or agent C 150. The requesting entity 110, secure database 145, database interface 125, and checker agent 150 are configured to communicate via network 120, third-party network 140, and private or trusted network 130.

The networks 120 and/or 140 may be global networks, such as the Internet or other publicly accessible networks. Various elements of the networks 120 and/or 140 may be interconnected by a wide area network, a local area network, an Intranet, and/or other private network, which may not be accessible by the general public, such that the communication networks 120 and/or 140 may represent a combination of public and private networks or a virtual private network (VPN). The private or trusted network 130 may be a wide area network, a local area network, an Intranet, and/or other private network (such as a VPN) and/or combination thereof, which may not be accessible by the general public. The networks 120, 130, and/or 140 may be wireless networks, wireline networks, or may be a combination of both wireless and wireline networks.

Access to the database 145 is provided by a third-party server and/or network 140, which is not directly controlled by a data owner 105. As shown in FIG. 1, the database 145 (also referred to herein as a third-party database) is a secured database that may be created by or responsive to a request from the data owner 105. For example, in a pre-processing step, a given database DB' may be compiled into secured data by the data owner 105. Compilation can involve adding meta-data that encodes one or more data access policies and various cryptographic keys/consistency tokens for storage with the database DB'. More generally, the data owner 150 may generate representations of the access policies for storage along with the associated data in the initial database DB'. The data owner 150 may upload the secured data (including the associated access policies) to the third party network 140 to create the secured third-party database 145.

In attempting to access data stored in the database 145, the requesting entity 110 submits a query q requesting data d (via an application or app 115) to the database interface 125. The query q may be generated by the app 115 in a conventional manner. For example, the app 115 may be a web browser or other user interface that is configured to generate the query q responsive to a character string or other input from the requesting entity 110. The app 115 may require authentication of the user or requesting entity 110 prior to generating and/or transmitting the query q to the database interface 125 in some embodiments.

The database interface 125 modifies or transforms the received query q to add meta-components and/or other information that may be used by the system 100 to perform the verification operations described herein. For example, where the received query q requests particular data d from the database 145, the database interface 125 may be configured to generate a modified query q' requesting the data d and also requesting a representation of the data access policy that is associated with the data d and/or the requesting entity 110. In particular embodiments described in detail below, the representation of the data access policy may be a Bloom Filter including a set of values that identify the particular data stored in the database 145 to which the requesting entity 110 is allowed to access. The modified query q' may be formatted or otherwise configured to be evaluated by the database 145.

Still referring to FIG. 1, the database interface 125 evaluates the modified query q' on the database 145, for example, using standard database querying mechanisms. For instance, in some embodiments, the query q and the modified query q' may both be SQL queries, and the database 145 may be a MySQL database. The query result R of evaluating the modified query q' on the database 145 may include the requested data d, and also the representation of the associated data access policy. The database 145 transmits the query result R to the checker agent 150, rather than back to the requesting entity 110. The database 145 may also transmit information identifying the requesting entity 110 (which issued the initial query q) to the checker agent 150. In some embodiments, the query result R and/or the information identifying the requesting entity 110 may be transmitted to the checker agent 150 by or via the database interface 125.

Upon receiving the query result R, the checker agent 150 performs one or more operations to verify that the data d (included in the query result R) complies with the data access policy that is applicable to the requesting entity 110 (also included in the query result R). For example, the access policy representation included in the query result R may list or otherwise identify the particular records stored in the database 145 to which the requesting entity 110 is authorized to access. The checker agent 150 may thereby perform a comparison of the data d included in the query result R with the data records indicated by the received access policy representation to determine whether the returned data d is compliant with the data access policy that applies to the requesting entity 110. As the query result R includes the applicable access policy representation along with the requested data d, the checker agent 150 may be configured to verify that the returned data d complies with the applicable access policy without locally storing the access policy and/or a description or representation thereof. If the check is successful, the checker agent 150 forwards the requested data to the requesting entity 110 via the app 115. On the other hand, if the check indicates that the data d included in the query result R is not compliant with the data access policy applicable to the requesting entity 110, the checker agent 150 prevents transmission of the requested data to the requesting entity 110.

Although FIG. 1 illustrates an example system 100 for verifying compliance with a data access policy when data is stored in a third-party database, it will be understood that the present invention is not limited to such configurations, but is intended to encompass any configuration capable of carrying out the operations described herein. For example, although described in FIG. 1 with reference to a standalone checker agent 150, it is to be understood that some or all of the functionality of the checker agent 150 may be implemented in the app 115 in some embodiments. For example, in such embodiments, the app 115 may be stored in a mobile terminal, which may thereby enforce the data access policies when wirelessly accessing the database 145 stored in third party network 140. Moreover, in some embodiments, the app 115 may be stored in a desktop computer or other non-portable consumer electronic device, and may enforce the data access policies when accessing the database 145 via a wired connection. The database interface 125 and the checker agent 150 may also be integrated in some embodiments. Furthermore, although illustrated as being included in the private/trusted network 130, the database interface 125 may be untrusted or otherwise outside of the network 130 in some embodiments. In order for the policy checking to pass, the information needed for checking should be included in the return set returned by the database 145. As such, if the database interface 125 were relied upon for such information but was not properly implemented and/or otherwise failed to provide such information, then the policy checking would fail. Accordingly, by not requiring the database interface 125 to be trusted, the verification operations described herein may be stronger and/or may have greater applicability. More generally, while illustrated with respect to particular functionality being performed by particular blocks in the Figures, it will be understood that the functionality of one or more blocks may be combined, divided, and/or eliminated.

Figure 2:
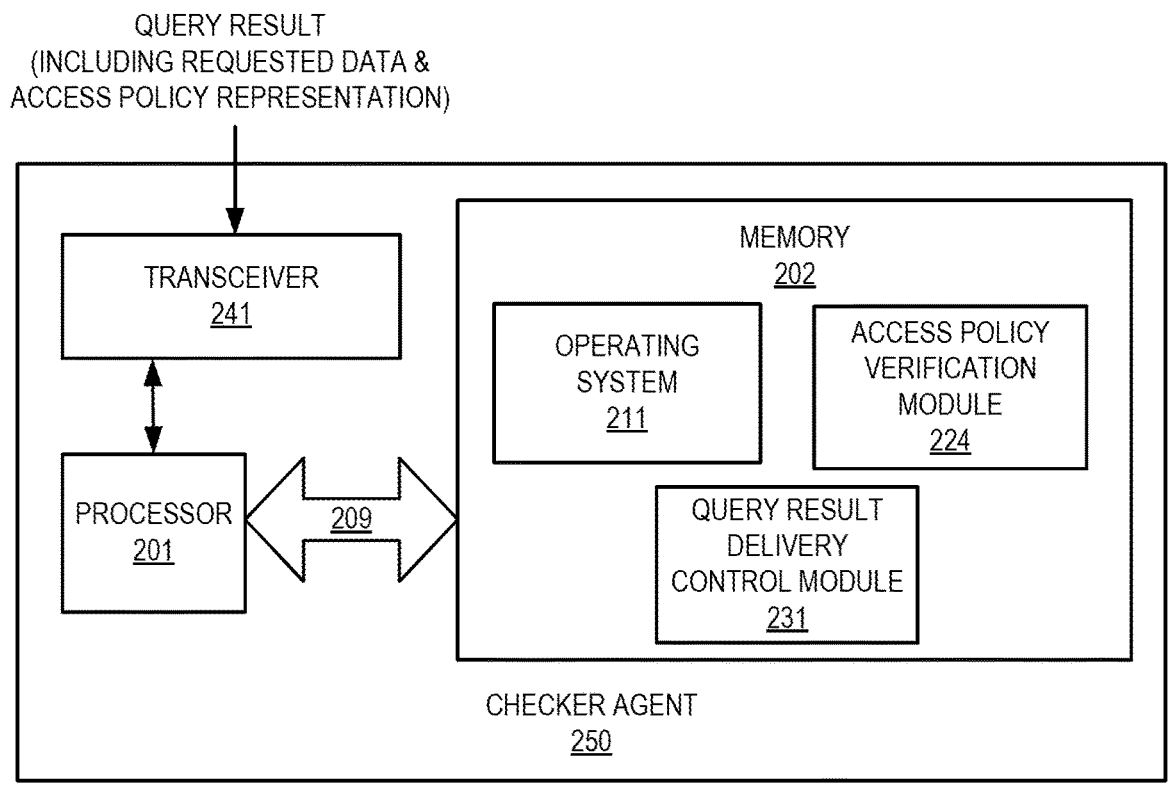
FIG. 2 is a block diagram that illustrates a hardware/software architecture for a checker agent in accordance with some embodiments of the present invention.

FIG. 2 illustrates a hardware/software architecture of a checker agent 250 in accordance with some embodiments of the present invention in greater detail. In some embodiments, the checker agent 250 may correspond to the checker agent 150 of FIG. 1. Referring now to FIG. 2, the checker agent 250 includes a processor 201, a transceiver 241, and a memory 202. The processor 201 communicates with the memory 202 via an address/data bus 209. The processor 201 may be, for example, a commercially available or custom microprocessor. The memory 202 is representative of the one or more memory devices containing the software and data used to verify compliance with one or more data access policies in accordance with embodiments of the present invention. The memory 202 may include, but is not limited to, the following types of devices: cache, ROM, PROM, EPROM, EEPROM, flash, SRAM, and DRAM. The transceiver 241 includes a transmitter circuit and a receiver circuit, which are used to establish and maintain communication with another party or destination, such as the application 115 used by the requesting entity 110, the secure database 145, and/or the data owner 105, via one or more networks, such as the networks 120, 130, 140 of FIG. 1.

As shown in FIG. 2, the memory 202 may contain multiple categories of software and/or data: an operating system 211, a data access policy verification module 224, and query result delivery control module 231. The operating system 211 generally controls the operation of the checker agent 250. In particular, the operating system 211 may manage the checker agent's 250 software and/or hardware resources and may coordinate execution of programs by the processor 201. The data access policy verification module 224 is configured verify whether a requesting entity is permitted to access data included in a received query result based on the corresponding data access policy.

In particular, the data access policy verification module 224 is configured to receive a query result and a representation of an associated data access policy from the secure database 145 and/or the database interface 125 via the transceiver 241. The representation of the data access policy may identify one or more records stored in the secure database 145 that are accessible to the requesting entity 110 in compliance with the access policy. The representation of the data access policy can additionally or alternatively identify one or more entities or users that are authorized to access the specific data included in the query result. The data access policy verification module 224 is configured to verify whether the requesting entity 110 is permitted to access the data included in the query result based on the representation of the data access policy. In some embodiments, the data access policy verification module 224 may be configured to check the data included in the query result against the representation of the access policy, for example, by hashing the data included in the query result with a cryptographic hash function (separately received from the data owner 105) to generate a hash value corresponding to the query result, and comparing the hash value with the representation of the access policy (which was generated using the same hash function). As such, the data access policy verification module 224 may be configured to determine whether or not the data included in the query result corresponds to one or more database records to which the requesting entity 110 is permitted to access, as identified by the representation of the access policy, without locally storing the access policy at the checker agent 250.

Responsive to the verification operations performed by the data access policy verification module 224, the query result delivery control module 231 is configured to control transmission of the data included in the query result to the requesting entity 110 via the transceiver 241. In particular, when the data access policy verification module 224 indicates that data included in the query result matches record(s) in the secure database 145 to which the requesting entity 110 is permitted to access (based on the comparison with the access policy representation), the query result delivery control module 231 is configured to allow transmission of the data to the requesting entity 110 via the transceiver 241. Conversely, when the data access policy verification module 224 indicates that data included in the query result does not correspond to record(s) in the secure database 145 to which the requesting entity 110 is permitted to access under the applicable access policy, the query result delivery control module 231 is configured to prevent transmission of the data to the requesting entity 110. In some embodiments, the data access policy verification module 224 may indicate that some of the data included in the query result matches database record(s) to which the requesting entity 110 is permitted to access, while others do not correspond to database record(s) to which the requesting entity 110 is permitted to access, and the query result delivery control module 231 may be configured to allow transmission of the matching data (which complies with the access policy) while preventing transmission of the other data (which does not comply with the access policy).

As such, the checker agent 250 may be implemented as a "lightweight" application that may not require local storage of a data access policy, but may nevertheless enforce the data access policy using the verification operations discussed above.

The data access policy verification module 224 and the query result delivery control module 231 may also be used to prevent code injection exploitation, for example, where a malicious SQL command (included in the query) requests data to which the requesting entity 110 is not permitted to access. While the secure database 145 may execute the SQL command in a conventional manner and thus return the corresponding query result to the checker agent 250, the data included in the query result may be prevented from being transmitted to the requesting entity 110 by the verification operations performed by the data access policy verification module 224 and the query result delivery control module 231 as discussed above.

Although FIG. 2 illustrates an example checker agent hardware/software architecture in accordance with some embodiments of the present invention, it will be understood that the present invention is not limited to such a configuration but is intended to encompass any configuration capable of carrying out the operations described herein. For example, while illustrated with reference to a dedicated processor 201 and memory 202, it will be understood that the checker agent 250 may be implemented as an application (such as the app 115 of FIG. 1) executing on a processor and/or stored in a memory of a personal electronic device associated with the requesting entity 110. More generally, although illustrated as a separate device, the architecture and/or functionality of the checker agent 250 may be integrated with the app 115 and/or the database interface 125 in a common device or network element in some embodiments.

Figure 3:
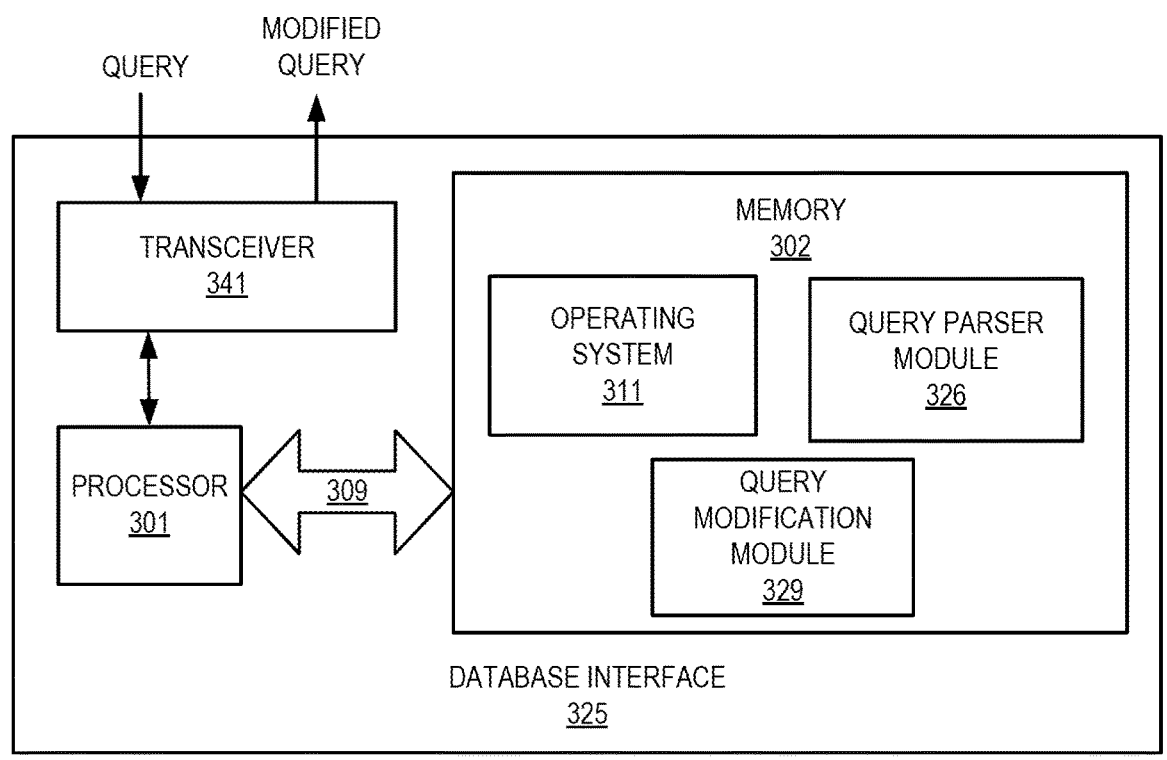
FIG. 3 is a block diagram that illustrates a hardware/software architecture of a database interface in accordance with some embodiments of the present invention.

FIG. 3 illustrates a hardware/software architecture of a database interface 325 in accordance with some embodiments of the present invention. In some embodiments, the database interface 325 may correspond to the database interface 125 of FIG. 1. Referring now to FIG. 3, the database interface 325 includes a processor 301, a transceiver 341, and a memory 302. The processor 301 communicates with the memory 302 via an address/data bus 309. The processor 301 may be, for example, a commercially available or custom microprocessor. The memory 302 is representative of the one or more memory devices containing the software and data used to verify compliance with one or more data access policies in accordance with embodiments of the present invention. The memory 302 may include, but is not limited to, the following types of devices: cache, ROM, PROM, EPROM, EEPROM, flash, SRAM, and DRAM. The transceiver 341 includes a transmitter circuit and a receiver circuit, which are used to establish and maintain communication with another party or destination, such as the application 115 used by the requesting entity 110, the secure database(s) 145, and/or the data owner 105, via one or more networks, such as the networks 120, 130, 140 of FIG. 1.

As shown in FIG. 3, the memory 302 may contain multiple categories of software and/or data: an operating system 311, query parser module 326, and query modification module 329. The operating system 311 generally controls the operation of the database interface 325. In particular, the operating system 311 may manage the database interface's 325 software and/or hardware resources and may coordinate execution of programs by the processor 301. The query parser module 326 and query modification module 329 are configured modify a query received from the requesting entity 110 to ensure that a data access policy corresponding to the requested data (and/or a representation thereof) is returned by the secure database 145 in response to the query.

In particular, the query parser module 326 is configured to receive a query from the app 115 via the transceiver 341. The query may be generated by the app 115 responsive to a request for data provided by the requesting entity 110. Responsive to receiving the query, the query parser module 326 is configured to identify the data being requested, and the query modification module 329 is configured to generate a modified query requesting both the identified data and also a representation of one or more associated data access policies. The modified query may specify the desired data access policy or policies based on the identity of the requesting entity 110 (that is, based on which of the records in the database the requesting entity 110 is authorized to access), and/or based on the identified data (that is, based on which entities are authorized to access the requested data). The representation of the specified data access policy or policies may be provided in the form of a Bloom filter representation that identifies some or all of the records of the secure database 145 that the requesting entity 110 is authorized to access (or that identifies particular entities that are authorized to access the particular data being requested). The query modification module 329 is configured to generate, format, and/or otherwise configure the modified query such that evaluation of the modified query at the secure database 145 returns a query result including the requested data and the representation of the associated data access policy or policies to the checker agent 150 or 250, as discussed above.

Although FIG. 3 illustrates an example database interface architecture in accordance with some embodiments of the present invention, it will be understood that the present invention is not limited to such a configuration but is intended to encompass any configuration capable of carrying out operations described herein. More generally, although illustrated as a separate device with a dedicated processor 301 and memory 302, the architecture and/or functionality of the database interface 325 may be integrated with the app 115 and/or the checker agent 150 in a common device or network element in some embodiments.

Figure 4:
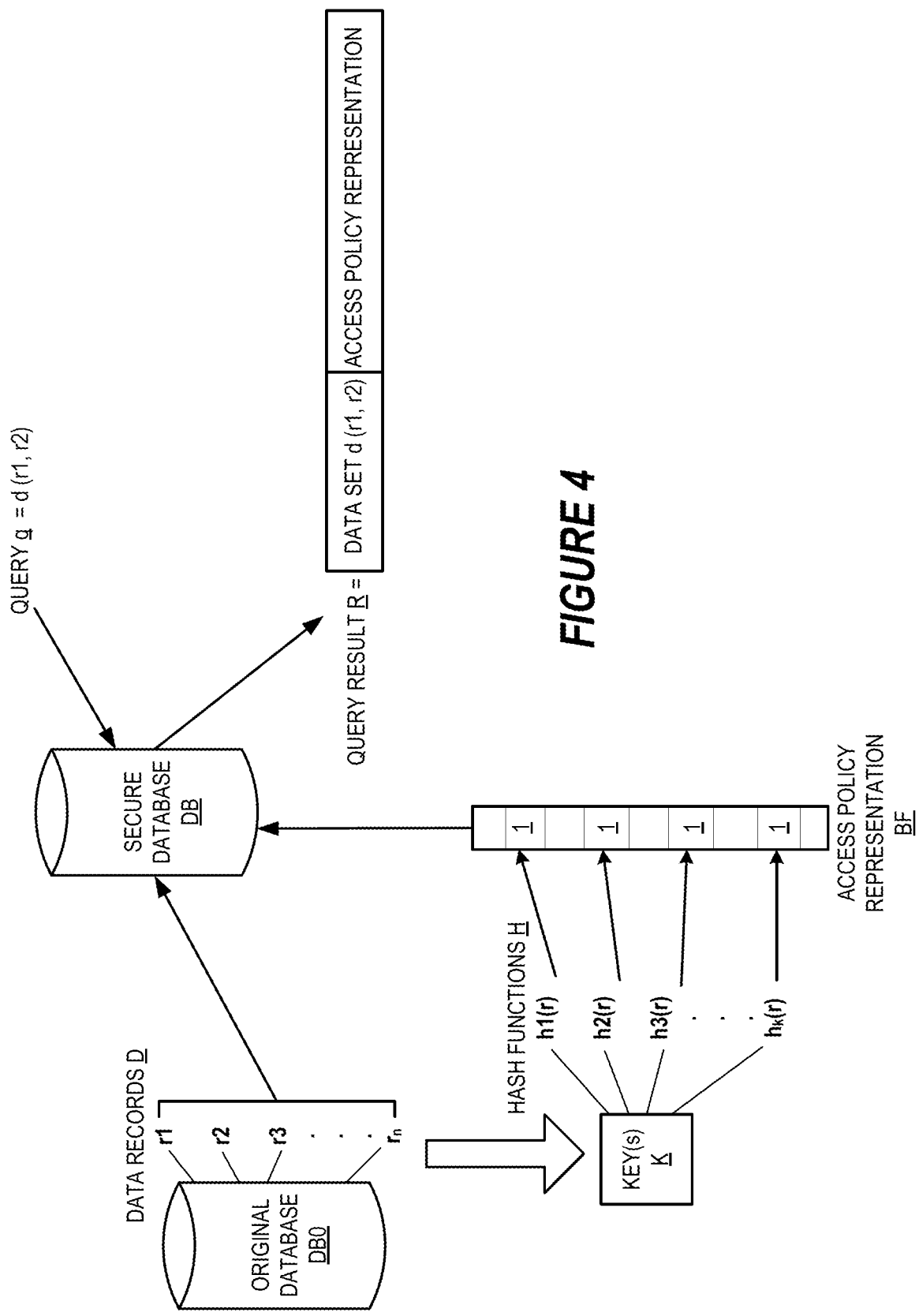
FIG. 4 is a block diagram that illustrates generation of an example representation of a data access policy in accordance with some embodiments of the present invention.

FIG. 4 illustrates generation of a secure database for use in verifying compliance with a data access policy in accordance with some embodiments of the present invention. In particular, FIG. 4 illustrates a secure database DB generated to include a plurality of data records D and respective access policy representations BF for each of a plurality of requesting entities, including for example the requesting entity 110 of FIG. 1.

In the example of FIG. 4, a Bloom Filter representation BF is generated to represent the data D that is accessible to each of a plurality of requesting entities using respective keys K (illustrated as cryptographic hash functions H). A Bloom filter is a probabilistic data structure configured to indicate whether an element is present in a set, based on whether the element is definitely not in the set or may be in the set. The Bloom filter BF is used to represent the set of data records $D=\{r1, r2, r3 \ldots r_n\}$ to which a particular user is permitted to access, according to the access policy for the data records D set by the data owner. The base data structure of a Bloom filter is a bit vector, illustrated as a table in FIG. 4. Each empty cell in the table represents a bit. To add the data records $D=\{r1, r2, r3 \ldots r_n\}$ to the Bloom filter BF, k independent hash functions $\{h1, h2, h3, \ldots h_k\}$ are chosen, the data records $D=\{r1, r2, r3 \ldots r_n\}$ are hashed, and the bits in the bit vector at the index of those hashes are set to 1 and stored in the table. The hash functions $\{h1, h2, h3, \ldots h_k\}$ may be independent and uniformly distributed.

Each access policy representation BF thereby identifies the records D of the database DB0 to which access is authorized for the corresponding user or requesting entity. In other words, for each known user that has access rights to the database DB0, a Bloom filter BF is generated to identify all of the data records D in the original database DB0 to which that particular user is allowed to access under the access policy. A secured database DB (such as the database 145 of FIG. 1) is created to include the plurality of records D and the respective access policy representations BF for each of the known users.

Still referring to FIG. 4, upon receipt of a query q for d (r1, r2) from a particular user, the string d (r1, r2) is hashed with the same hash functions used to generate the Bloom filter BF for that user, and it is determined whether the resulting values are set in the Bloom filter BF. If not, it is determined that the data set d (r1, r2) is not accessible to the requesting user under the applicable access policy, and transmission of the requested data set d (r1, r2) to the user is denied or otherwise prevented. If the resulting values are set in the Bloom filter, it is determined that the data set d (r1, r2) is accessible to the requesting user under the applicable access policy, and a query result R is generated to include both the requested data set d (r1, r2) and the access policy representation BF and transmitted to the user.

It will be understood that, as the Bloom filter is a probabilistic data structure, it is possible that returning the data set d (r1, r2) to the user may not be compliant with the access policy even if the values resulting from the hashing of the string d (r1, r2) included in the Bloom filter BF. However, the number of k independent hash functions and/or the bit vector size m can be chosen such that the probability of a false positive is acceptable. Furthermore, although described herein with reference to a Bloom filter as a particular data structure that is used to represent an access policy by way of example, it will be understood that embodiments of the present invention are not limited to the use of Bloom filters, and that other data structures may also be used to represent the access policies in accordance with the teachings herein.

Computer program code for carrying out operations of devices, terminals, and/or systems discussed above with respect to FIGS. 1-4 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described herein with reference to message flow, flowchart and/or block diagram illustrations of methods, devices, and/or computer program products in accordance with some embodiments of the invention. These message flow, flowchart and/or block diagrams further illustrate example operations for verifying compliance with data access policies for data stored in a third-party database in accordance with various embodiments of the present invention. It will be understood that each message/block of the message flow, flowchart and/or block diagram illustrations, and combinations of messages/blocks in the message flow, flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the message flow, flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the message flow, flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the message flow, flowchart and/or block diagram block or blocks.

Figure 5:
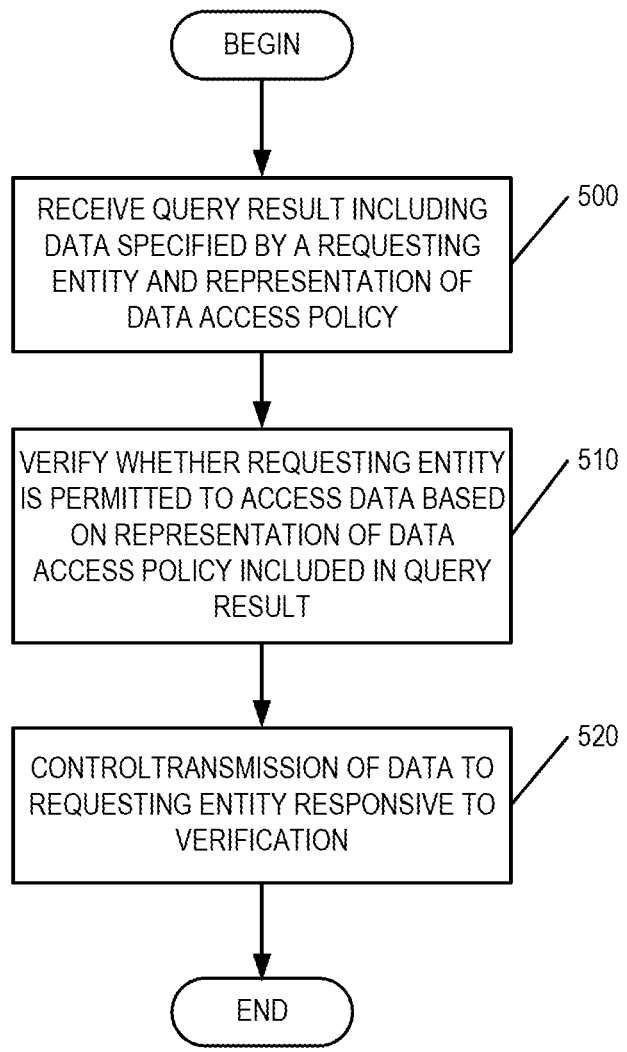
FIGS. 5-6 are flowcharts that illustrate operations for verifying compliance with data access policies for data stored in a third-party database in accordance with some embodiments of the present invention.

FIG. 5 is a flowchart illustrating operations for verifying compliance with a data access policy for data stored in a third-party database according to some embodiments of the present invention. In some embodiments, the operations of FIG. 5 may be performed by the checker agent 150 and/or 250 of FIGS. 1-2. Referring now to FIG. 5, a query result including data specified by a requesting entity and a representation of an associated data access policy is received at block 500. The query result may be received from a third-party database in which data from a data owner is stored, in response to a query from the requesting entity. The representation of the data access policy may identify one or more records stored in the database to which the requesting entity is permitted to access according to the access policy, and/or one or more entities that are authorized to access the requested data according to the access policy.

At block 510, it is verified whether the requesting entity is permitted to access the data based on the representation of the data access policy. For example, the data received in the query result may be compared with the records indicated by the representation of the data access policy to determine whether the data matches any of the records. In some embodiments, a key (for instance, a cryptographic hash function) that was also used to generate the access policy representation may be received from the data owner, and the data included in the query results may be checked against the representation of the access policy using the key. In particular, data included in the query result may be hashed using the cryptographic hash function to generate a hash value corresponding to the data, and the hash value may be compared with the access policy representation to determine whether the values match (indicating compliance with the access policy for the requested data), or do not match (indicating non-compliance with the access policy for the requested data).

Responsive to the verification operations performed at block 510, transmission of the query results to the requesting entity is controlled at block 520. In particular, when the verification at block 510 indicates non-compliance with the access policy for the requested data, transmission of the data included in the query result is prevented or otherwise denied to the requesting entity. Conversely, when the verification at block 510 indicates compliance with the access policy for the requested data, transmission of the data included in the query result to the requesting entity is allowed. As such, by structuring the query such that a representation of the applicable access policy is included in the query result along with the requested data, embodiments of the present invention may allow for enforcement of the applicable access policy without local storage and/or other prior knowledge thereof.

Figure 6:
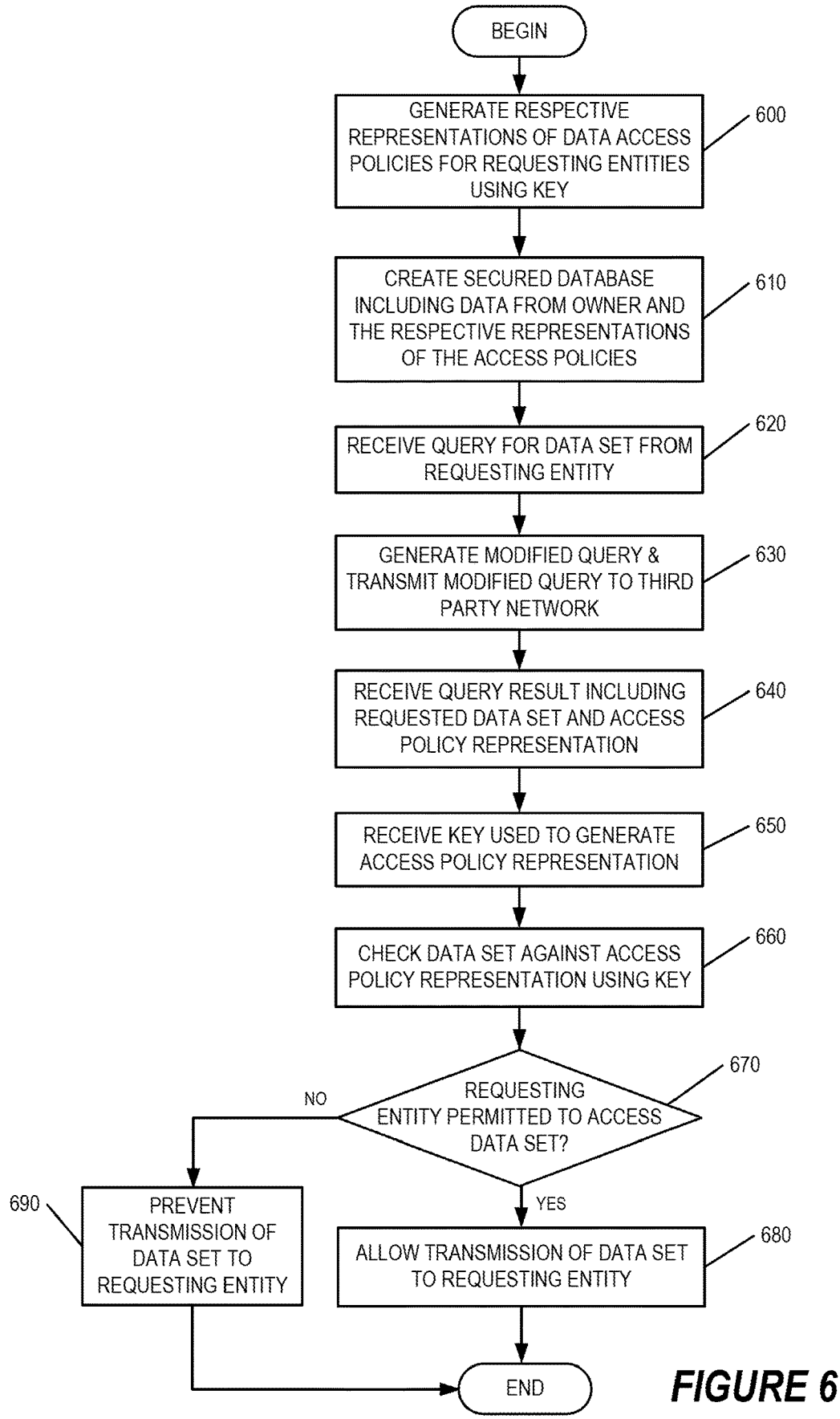

FIG. 6 is a flowchart illustrating operations for verifying compliance with a data access policy for data stored in a third-party database according to some embodiments of the present invention in greater detail. Referring now to FIG. 6, a data owner desires to use an untrusted third party server to store a database DB0. In a pre-processing operation, respective access policies for the data records stored in the database DB0 are defined for each of a plurality of users by tuples of the form (uid, rid1, . . . , ridn, cid1, . . . , cidm), representing that a user uid is allowed to access columns (attributes) cid1, . . . , cidm in records with identifiers rid1, . . . , ridn. In some embodiments, the entirety of the records that are accessible to each user uid may be identified by the corresponding access policy.

At block 600, a Bloom Filter representation $BF_{uid}$ is generated for each user uid, and values of the form rid-|data|K are inserted into each Bloom Filter. For each value defined by the Bloom Filter representation, rid is a record identifier, data is the payload from a permitted column (that is listed among cid1, . . . , cidm), and K is a key (for example, a cryptographic hash function) that is shared by the preprocessor and the policy checking agents. In other words, using the key K, a Bloom Filter is generated for each user uid to include all of the data records to which that user uid is authorized to access. As such, a secured database DB (including the data records of the original database DB0, and also the Bloom Filter representations $BF_{uid}$ is for each user) is created and provided to the third-party server at block 610. In some embodiments, the operations of blocks 600 and 610 may be performed by the data owner 105 of FIG. 1, and the secured database DB may be stored by the third party server as the secured database 145 of FIG. 1.

Still referring to FIG. 6, a query q from a requesting entity is received at block 620. The query q includes a request for a data set d, which is a subset of the data stored in the secured database DB. At block 630, the query q is altered to generate a modified query q', and the modified query q' is transmitted to the third-party network. The modified query q' includes the request for the data set d, as well as a request for the Bloom Filter $BF_{uid}$ corresponding to the requesting entity. The modified query q' may also identify the requesting entity. In some embodiments, the operations of blocks 620 and 630 may be performed by the database interface 125 and/or 325 of FIGS. 1 and 3.

Upon evaluation of the modified query q' at the secured database DB, a query result R is returned and received at block 640. The query result R may include the data set d (which would have resulted from applying the initial query q to the original database DB0), as well as the Bloom Filter $BF_{uid}$ corresponding to the requesting entity. In addition, the key K that was used to generate the Bloom Filter $BF_{uid}$ is separately received (for example, from the data owner) at block 650. As such, at block 660, the data set d is checked against the Bloom Filter $BF_{uid}$ using the key K, for example, by hashing the data set d with the key K to generate a hash value, and comparing the hash value with the values stored in the Bloom Filter $BF_{uid}$ (which was also generated using the key K). If the comparison at block 660 indicates a match between the data set d and the access policy representation $BF_{uid}$, it is determined at block 670 that the requesting entity is authorized to access the data set d in compliance with the data access policy, and the requested data set d is transmitted to the requesting entity at block 680. On the other hand, if the comparison at block 660 indicates that the data set d does not match the access policy representation $BF_{uid}$, it is determined at block 680 that the requesting entity is not permitted access to the data set d under the data access policy, and transmission of the requested data set d to the requesting entity is prevented or otherwise denied at block 690.

In some embodiments, the operations of blocks 640 to 690 may be performed by a checker C, such as the checker agent 150 and/or 250 of FIGS. 1-2. For example, the checker C may receive the data set d and the Bloom Filter $BF_{uid}$ containing hash values representing the data that is accessible by the user uid at block 640. More particularly, the checker C may be initialized with the key K that is used by the data owner to generate the Bloom Filter $BF_{uid}$ during pre-processing in blocks 600 and 610. Given the data set d and the Bloom Filter $BF_{uid}$ for the user uid that submitted the query q, the checker C iterates through the records included in the data set d and checks them against the Bloom Filter with the key K at block 660. Specifically, let (rid, c1, . . . , cl) be a record in d, where rid is the record identifier, and c1, . . . , cl are attributes (column payloads) of the record. Membership of the tuple (K, rid, ci) in $BF_{uid}$ is tested for $1 \leq i \leq l$. If all such tuples are determined to be in the Bloom Filter, the checker C proceeds to the next record in the data set d. In some embodiments, the checks performed by the checker C must succeed for the entire data set d at block 660 in order to forward the data set d to the user uid at block 680; otherwise, if one of the checks fails, the entire result set d is prevented or blocked from transmission to the requesting entity at block 690. In other embodiments, particular records of the data set d that pass the check at block 660 may be forwarded to the user uid at block 680, while other records of the data set d that do not pass the check at block 660 may be prevented from transmission to the user uid at block 690.

It will be understood that the above checks at block 660 can be parallelized across records and attributes. That is, each tuple (K, rid, ci) for all rid and all i can be checked independently, without need to wait for any of the other checks to conclude. However, it will be understood that the above checks may be susceptible to false positives as a consequence of using a Bloom Filter for set representation of the applicable data access policy. Thus, embodiments of the present invention are not limited to the particular access policy representations described herein, but may generally encompass any representation of a desired access policy that can be included in a query result along with the requested data.

Accordingly, embodiments of the present invention can verify whether a data set returned by a third-party server responsive to a client query complies with an access policy defined by the data owner for the data set, without requiring local storage of the access policy or a description thereof. Embodiments of the present invention may thereby allow a data owner to store data on one or more arbitrary servers, while still imposing desired data access policies on the data. For example, a cloud storage solution, verification operations in accordance with embodiments of the present invention can ensure that the requesting entity doesn't receive data beyond that which it is entitled to under the corresponding access policy.

Embodiments of the present invention may be implemented as a lightweight checker agent, and may be implemented in front of any data access request by sending the checker the requested data along with an indication of the data in the database to which the requesting entity is allowed access in compliance with the access policy. This can also be used to reduce or prevent SQL or other code injection exploitation by the requesting entity, as the checker agent can prevent transmission of any additional data returned in response to a SQL command if it does not comply with the access policy. The checker agent can also be implemented as an application that is stored and executed on a mobile or other client device, allowing for enforcement of the data owner's policies when the requested data is stored in a third party cloud storage solution.

Many variations and modifications can be made to the embodiments without substantially departing from the principles of the present invention. All such variations and modifications are intended to be included herein within the scope of the present invention, as set forth in the following claims.

The invention claimed is:

1. A method, comprising:
comparing, by a server, electronic data to an electronic data access policy identified by a database, comprising:
receiving, by the server, a cryptographic key from a data owner of the electronic data, wherein the cryptographic key comprises a hash function used to generate the electronic data access policy; and
determining, by the server, whether at least a portion of the electronic data complies with the electronic data access policy based on the cryptographic key received from the data owner;
determining, by the server, that an access to the electronic data by a communication device is permissible when the portion of the electronic data complies with the electronic data access policy; and
transmitting, by the server, the portion of the electronic data to the communication device when the access to the electronic data is permissible.

2. The method of claim 1, further comprising:
determining, by the server, that the portion of the electronic data fails to comply with the electronic data access policy.

3. The method of claim 2, further comprising:
declining, by the server, the access to the electronic data in response to the portion of the electronic data failing to comply with the electronic data access policy.

4. The method of claim 1, further comprising:
hashing, by the server, the electronic data using the hash function to generate a hash value representing the electronic data.

5. The method of claim 4, further comprising:
comparing, by the server, the hash value representing the electronic data to the electronic data access policy.

6. A system, comprising:
a hardware processor of a first communication device; and
a memory device, the memory device storing instructions, the instructions when executed causing the hardware processor to perform operations, the operations comprising:
comparing electronic data to an electronic data access policy, comprising:
receiving a cryptographic key from a data owner of the electronic data, wherein the cryptographic key comprises a hash function used to generate the electronic data access policy; and
determining whether at least a portion of the electronic data complies with the electronic data access policy based on the cryptographic key received from the data owner;
determining that an access to the electronic data by a communication device is permissible when the portion of the electronic data complies with the electronic data access policy; and
transmitting the electronic data to the communication device when the access to the electronic data is permissible.

7. The system of claim 6, wherein the operations further comprise:
determining that the portion of the electronic data fails to comply with the electronic data access policy.

8. The system of claim 7, wherein the operations further comprise:
declining the access to the electronic data in response to the portion of the electronic data failing to comply with the electronic data access policy.

9. The system of claim 6, wherein the operations further comprise:
hashing the electronic data using the hash function to generate a hash value representing the electronic data.

10. The system of claim 9, wherein the operations further comprise:
comparing the hash value representing the electronic data to the electronic data access policy.

11. A non-transitory memory device storing instructions that when executed cause a hardware processor of a first communication device to perform operations, the operations comprising:
receiving a result of an electronic query, wherein the electronic query is initiated by a second communication device;
comparing electronic data of the result to an electronic data access policy, comprising:
receiving a cryptographic key from a data owner of the electronic data, wherein the cryptographic key comprises a hash function used to generate the electronic data access policy; and
determining whether at least a portion of the electronic data complies with the electronic data access policy based on the cryptographic key received from the data owner;
determining that an access to the electronic data by the second communication device is permissible when the portion of the electronic data complies with the electronic data access policy; and
transmitting the portion of the electronic data to the second communication device when the access to the electronic data by the second communication device is permissible.

12. The non-transitory memory device of claim 11, wherein the operations further comprise:
determining that the portion of the electronic data fails to comply with the electronic data access policy.

13. The non-transitory memory device of claim 12, wherein the operations further comprise:
declining the access to the electronic data by the second communication device in response to the portion of the electronic data failing to comply with the electronic data access policy.

14. The non-transitory memory device of claim 12, wherein the operations further comprise:
comparing the hash value representing the electronic data to the electronic data access policy.

15. The non-transitory memory device of claim 11, wherein the operations further comprise:
hashing the electronic data using the hash function to generate a hash value representing the electronic data.

* * * * *

UNITED STATES PATENT AND TRADEMARK OFFICE
CERTIFICATE OF CORRECTION

PATENT NO. : 11,716,357 B2
APPLICATION NO. : 17/515616
DATED : August 1, 2023
INVENTOR(S) : Evgene Vahlis and Paul Giura It is certified that error appears in the above-identified patent and that said Letters Patent is hereby corrected as shown below:

In the Drawings

In drawing sheet 4 of 5, figure 5, block 520, delete "CONTROLTRANSMISSON" and insert --CONTROL TRANSMISSION--, therefor.

In the Specification

In Column 1, Line(s) 26, delete "execute" and insert --are executed--, therefor.
In Column 1, Line(s) 38, delete "area" and insert --are--, therefor.
In Column 4, Line(s) 49, after "may", delete "be".
In Column 7, Line(s) 43, after "configured", insert --to--.

Signed and Sealed this
Twenty-third Day of April, 2024

*Katherine Kelly Vidal*

Katherine Kelly Vidal
*Director of the United States Patent and Trademark Office*